US006297297B1

(12) United States Patent
Brookman et al.

(10) Patent No.: US 6,297,297 B1
(45) Date of Patent: Oct. 2, 2001

(54) FLOORING CONTAINING MICROBEADS

(75) Inventors: Robert S. Brookman, Providence; Charles Gates, Warwick; Lawrence Wallace, North Kingstown, all of RI (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

(21) Appl. No.: 09/519,503

(22) Filed: Mar. 6, 2000

(51) Int. Cl.[7] .......................... B32B 27/30

(52) U.S. Cl. .......................... 523/218; 428/522

(58) Field of Search .......................... 523/218; 428/522

(56) References Cited

U.S. PATENT DOCUMENTS

| | | | | |
|---|---|---|---|---|
| 4,599,264 | * | 7/1986 | Kauffman | 428/264 |
| 4,923,657 | | 5/1990 | Gembinski et al. | 264/73 |
| 5,015,516 | | 5/1991 | Lussi et al. | 428/143 |
| 5,059,471 | * | 10/1991 | McNally | 428/143 |
| 5,169,704 | | 12/1992 | Faust et al. | 428/143 |
| 5,246,765 | * | 9/1993 | Lussi | 428/203 |
| 5,260,118 | * | 11/1993 | Lussi | 428/203 |
| 5,525,274 | | 6/1996 | Grimmer | 264/13 |
| 5,654,102 | | 8/1997 | Grimmer | 428/402 |
| 5,670,237 | * | 9/1997 | Shultz | 428/173 |

* cited by examiner

*Primary Examiner*—Paul R. Michl
(74) *Attorney, Agent, or Firm*—Fish & Richardson P.C.

(57) ABSTRACT

A method of making a multilayered, resilient flooring containing a multicolored pattern is disclosed. The method includes applying a multiplicity of pigmented, thermoplastic microbeads to a top surface of a thermoplastic base layer to form a pattern layer on the base layer, which typically remains sufficiently hot so that it is molten or tacky when the microbeads are applied. The base layer and pattern layer can be covered with a substantially transparent material to form a clear top layer. The base layer can be formed by melting a dry blend comprising polyvinylchloride (PVC) to produce a molten PVC output, shaping the molten PVC output into a smooth PVC sheet of uniform thickness. The microbeads can be applied to the base layer using a stencil. The multiplicity of microbeads can include microbeads of two or more colors. Preferably, the microbeads are approximately spherical and have an average diameter between 0.002" and 0.040". Optionally, the method includes bonding a backing layer to bottom of the base layer.

28 Claims, No Drawings

FLOORING CONTAINING MICROBEADS

TECHNICAL FIELD

This invention relates to floor covering.

BACKGROUND

Laminated floor coverings incorporating thermoplastic resins are widely used in residential and commercial settings. Such products often include a felt backing material and a clear top layer (sometimes called a "wear layer") overlaying a printed design or decorative chips or flakes on a core layer of thermoplastic. Because they are relatively soft in comparison with concrete or ceramic tile, laminated floor coverings are also known as resilient floor coverings. Laminated floor coverings are marketed as sheet materials and as square "tiles."

SUMMARY

The invention provides a method of making a multi-layered floor covering containing a multicolored pattern. The method includes applying a multiplicity of pigmented, thermoplastic microbeads to a top surface of a thermoplastic base layer to form a pattern layer on the base layer. Preferably, the base layer remains sufficiently hot so that it is molten or tacky when the microbeads are applied. In some embodiments the method includes covering the base layer and pattern layer with a substantially transparent material, e.g., a polyurethane or liquid PVC plastisol to form a clear top layer. In some embodiments of the method, formation of the clear top layer involves heating the substantially transparent material, for example by passing the base layer, pattern layer and clear top layer through a fusion oven.

A base layer having a top surface and a bottom surface can be formed by melting a dry blend comprising polyvinyl-chloride (PVC) to produce a molten PVC output, and shaping the molten PVC output into a substantially smooth PVC sheet of substantially uniform thickness. This can be accomplished by feeding the molten PVC output into a three-roll or four-roll calender. A fluxing device can be used in producing the molten PVC output. In some embodiments, the molten PVC output is fed from the fluxing device into a mill for further melt mixing prior to formation of the base layer. If a dry blend is used to produce the base layer, the dry blend can contain one or more of the following: a plasticizer, a stabilizer, a lubricant and a filler.

The microbeads can applied to the base layer using a stencil. The multiplicity of microbeads can include microbeads of two or more colors. The microbeads can contain a thermoplastic such as a polyvinyl chloride, a polyurethane, a polypropylene, a polyethylene, a polystyrene, an epoxy and an alloyed polyvinyl chloride. Preferably, the microbeads are approximately spherical and have an average diameter between 0.002" and 0.040".

Optionally, the method includes bonding a backing layer to the bottom of the base layer. Bonding of the backing layer can be carried out prior to formation of the pattern layer. An exemplary backing layer is a dense felt material.

All publications, patents and other references mentioned herein are incorporated by reference. The details of one or more embodiments of the invention are set forth in the description below. Other features, objects, and advantages of the invention will be apparent from the description and drawings, and from the claims.

DETAILED DESCRIPTION

In an exemplary embodiment of the invention, PVC resin, plasticizers, stabilizers, lubricants and fillers are dry blended in a ribbon or high intensity mixer in a conventional manner. The dry blend is conveyed to a batch or continuous fluxing device (e.g., Banbury or FCM). The molten output of the fluxing device is delivered to a large two-roll mill for further melt mixing. The molten material is strip-fed into the top roll of a three-roll or four-roll calender, which shapes the molten material into a smooth sheet of uniform thickness. The width of the sheet varies, depending on the manufacturing equipment used. For example, with some equipment, the width of the sheet can be up to 13 feet.

A dense felt material, in continuous roll form, is fed into one of the calender rolls, where the felt bonds to the bottom of the PVC sheet. As the heated vinyl/felt composite leaves the last heated calender roll, it passes under a stenciling unit. Microbeads, in various colors, pass through the stencil and fall onto the hot vinyl/felt composite (on the vinyl side) in the decorative pattern of the stencil. The microbeads adhere to the vinyl base layer, forming a pattern layer.

The felt/vinyl/microbead laminate is top-coated with a liquid PVC plastisol. Then the coated laminate is passed into a conventional fusion oven, where the plastisol is converted to a clear, solid layer. The clear, top layer seals the colored pattern layer between clear, top layer and the vinyl base layer. After passage through the fusion oven, the multi-layered, composite flooring is cooled and rolled for storage or shipment. The decorative pattern exhibits vibrant color and gives a three-dimensional effect.

The base layer can be formed using conventional flooring materials, methods and manufacturing equipment well known in the art. See, e.g., Faust et al., U.S. Pat. No. 5,169,704 or Lussi et al., U.S. Pat. No. 5,015,516.

Various materials can be used to form an optional backing layer bonded to the bottom surface of the base layer. Bonding between the base layer and backing layer can be accomplished by thermal fusion or by the use of a suitable adhesive. A cardboard-like felt, or other durable, fibrous, nonwoven material is particularly suitable for use as a backing material. One advantage of dense felt materials is that they bond well with adhesives employed during flooring installation to hold the resilient flooring securely in place on an underlying substrate such as wood or concrete. Backing material also can be chosen for other properties, for example, durability, flexibility (for rolling) and a desired level of cushioning, when in use after installation.

Suitable pigmented, thermoplastic microbeads can be formed by conventional methods, using various known thermoplastic compositions. For example, formation of thermoplastic microbeads can be accomplished using materials and methods described in Gembinski et al., U.S. Pat. No. 4,923,657; Grimmer, U.S. Pat. No. 5,525,274; and Grimmer, U.S. Pat. No. 5,654,102.

Thermoplastic microbeads useful in the invention can be formed in a process that includes mixing PVC with pigment, melting the resultant mixture and directing it in the molten state and cutting it into particles that are cooled in a water chamber to cause the particles to be shaped into microspheres having an outer diameter of approximately 0.007" to 0.40" and an outer surface that appears smooth up to a magnification of 80×. In some processes for making microbeads, PVC with a molecular weight from 50,000 to 150,000 is used. Use of thermoplastic with a lower molecular weight may permit use of lower process temperature or decreased cycle time. Suitable microbeads also can be produced in a similar process using thermoplastic polyurethane material instead of PVC. Such processes are described, e.g., in Grimmer, U.S. Pat. No. 5,525,274 and Grimmer, U.S. Pat. No. 5,654,102.

When practiced using appropriate, conventional flooring manufacturing equipment and processes and materials, methods of the invention can be employed to produce sheet-type flooring (rolls) or square flooring "tiles." Use of such equipment, processes and materials is within ordinary skill in the art.

A number of embodiments of the invention have been described. Nevertheless, it will be understood that various modifications may be made without departing from the spirit and scope of the invention. For example, methods of the invention can be carried out using various backing layer materials, any suitable manufacturing equipment. Accordingly, other embodiments are within the scope of the following claims.

What is claimed:

1. A method of making multi-layered floor covering, comprising: applying a multiplicity of pigmented, thermoplastic microbeads to a portion of a smooth top surface of a thermoplastic base layer to form a decorative pattern on the top surface of the base layer, wherein the base layer is sufficiently hot so as to be molten or tacky when the microbeads are applied.

2. The method of claim 1, further comprising covering the base layer and decorative pattern with a substantially transparent material to form a clear top layer.

3. The method of claim 1, wherein the substantially transparent material comprises a polyurethane or liquid PVC plastisol.

4. The method of claim 2, further comprising heating the substantially transparent material.

5. The method of claim 4, wherein the heating is accomplished by passing the base layer, decorative pattern and clear top layer through a fusion oven.

6. The method of claim 1, further comprising forming the base layer by melting a dry blend comprising polyvinylchloride (PVC) to produce a molten PVC output, shaping the molten PVC output into a substantially smooth PVC sheet of substantially uniform thickness, to form the base layer, wherein the base layer has a top surface and a bottom surface.

7. The method of claim 6, wherein the molten PVC output is produced in a fluxing device.

8. The method of claim 7, wherein the molten output is fed from the fluxing device into a mill for further melt mixing prior to formation of the base layer.

9. The method of claim 1, wherein the dry blend further comprises one or more of the following: a plasticizer, a stabilizer, a lubricant and a filler.

10. The method of claim 6, wherein the molten PVC output is fed into a three-roll or four-roll calender to shape the molten PVC output.

11. The method of claim 1, wherein the microbeads are applied to the portion of the top surface of the base layer using a stencil.

12. The method of claim 1 wherein the multiplicity of microbeads comprises microbeads of 2 or more colors.

13. The method of claim 1, wherein the microbeads comprise a thermoplastic selected from the group consisting of a polyvinyl chloride, a polyurethane, a polypropylene, a polyethylene, a polystyrene, an epoxy and an alloyed polyvinyl chloride.

14. The method of claim 1, wherein the microbeads are approximately spherical and have an average diameter between 0.002" and 0.040".

15. The method of claim 1, further comprising bonding a backing layer to bottom of the base layer.

16. The method of claim 15, wherein the bonding is carried out prior to formation of the decorative pattern.

17. The method of claim 15, wherein the backing layer comprises felt.

18. A method of making multi-layered floor covering, comprising: applying a multiplicity of pigmented, thermoplastic microbeads to a top surface of a thermoplastic base layer using a stencil to form a decorative pattern on the top surface of the base layer, wherein the base layer is sufficiently hot so as to be molten or tacky when the microbeads are applied.

19. The method of claim 18, further comprising covering the base layer and decorative pattern with a substantially transparent material to form a clear top layer.

20. The method of claim 18, further comprising forming the base layer by melting a dry blend comprising polyvinylchloride (PVC) to produce a molten PVC output, shaping the molten PVC output into a substantially smooth PVC sheet of substantially uniform thickness, to form the base layer, wherein the base layer has a top surface and a bottom surface.

21. The method of claim 18, wherein the microbeads are approximately spherical and have an average diameter between 0.002" and 0.040".

22. The method of claim 1, wherein the microbeads have an outer surface that appears smooth at magnification of 80×.

23. The method of claim 18, wherein the microbeads have an outer surface that appears smooth at magnification of 80×.

24. A method of making a multi-layer floor covering, comprising:

applying a multiplicity of pigmented, thermoplastic microbeads to a portion of a top surface of a thermoplastic base layer to form a decorative pattern on the base layer, wherein the base layer is sufficiently hot so as to be molten or tacky when the microbeads are applied.

25. The method of claim 24, further comprising covering the base layer and decorative pattern with a substantially transparent material to form a clear top layer.

26. The method of claim 24, further comprising forming the base layer by melting a dry blend comprising polyvinylchloride (PVC) to produce a molten PVC output, shaping the molten PVC output into a substantially smooth PVC sheet of substantially uniform thickness, to form the base layer, wherein the base layer has a top surface and a bottom surface.

27. The method claim 24, wherein the microbeads are approximately spherical and have an average diameter between 0.002" and 0.040".

28. The method of claim 24, wherein the microbeads have an outer surface that appears smooth at magnification of 80×.

* * * * *